United States Patent
Cai et al.

(10) Patent No.: US 10,237,126 B2
(45) Date of Patent: *Mar. 19, 2019

(54) SHARING A JAVA VIRTUAL MACHINE

(71) Applicant: INTERNATIONAL BUSINESS MACHINES CORPORATION, Armonk, NY (US)

(72) Inventors: Junjie Cai, Cary, NC (US); Lei Chen, Shanghai (CN); Weiwei Gao, Shanghai (CN); Sanhong Li, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/588,644

(22) Filed: May 6, 2017

(65) Prior Publication Data
US 2017/0257266 A1    Sep. 7, 2017

Related U.S. Application Data

(63) Continuation of application No. 14/510,887, filed on Oct. 9, 2014, now Pat. No. 9,686,129.

(30) Foreign Application Priority Data

Oct. 25, 2013    (CN) .......................... 2013 1 0511235

(51) Int. Cl.
*H04L 29/12*    (2006.01)
*H04L 12/24*    (2006.01)
*G06F 9/455*    (2018.01)

(52) U.S. Cl.
CPC ...... *H04L 41/0803* (2013.01); *G06F 9/45558* (2013.01); *H04L 61/2015* (2013.01); *G06F 2009/45595* (2013.01); *H04L 41/0806* (2013.01)

(58) Field of Classification Search
CPC ............ H04L 41/0803; H04L 61/2015; H04L 41/0806; G06F 2009/45595; G06F 9/45558
See application file for complete search history.

(56) References Cited

U.S. PATENT DOCUMENTS 8,392,564 B1    3/2013    Czajkowski et al.
8,589,918 B1 *    11/2013    Sapuntzakis ........ G06F 9/44542
                                                                              718/1

(Continued)

FOREIGN PATENT DOCUMENTS

CN    101639770 A    2/2010
CN    103065081 A    4/2013

OTHER PUBLICATIONS

Casado et al., "Virtualizing the network forwarding plane", Presto 10 Proceedings of the Workshop on Programmable Routers for Extensible Services of Tomorrow, copyright 2010, accessible from the Internet at <http://yuba.stanford.edu/~casado/virt-presto.pdf> <http://dl.acm.org/citation.cfm?id=1921162> as of Aug. 7, 2014, 6 pages.

(Continued)

*Primary Examiner* — Kim T Nguyen
(74) *Attorney, Agent, or Firm* — Richard Wilhelm; Amy J. Pattillo (57) ABSTRACT

A JAVA virtual machine with multiple tenants is shared by allocating an IP address to each of the tenants, creating a separate virtual network interface for each of the tenants and configuring each separate virtual network interface with the respective separate IP address allocated for each tenant. For each of the tenants, network operations are performed via the virtual network interface created for that tenant, to provide for network isolation of each tenant sharing a JAVA virtual machine.

10 Claims, 3 Drawing Sheets

(56) References Cited

U.S. PATENT DOCUMENTS

| | | | |
|---|---|---|---|
| 9,686,129 B2* | 6/2017 | Cai | H04L 41/0803 |
| 2007/0189276 A1 | 8/2007 | Bennett et al. | |
| 2008/0288622 A1* | 11/2008 | Gordon | G06F 9/542 |
| | | | 709/223 |
| 2010/0049570 A1 | 2/2010 | Li et al. | |
| 2013/0018765 A1* | 1/2013 | Fork | H04L 67/10 |
| | | | 705/34 |
| 2013/0060929 A1 | 3/2013 | Koponen et al. | |
| 2013/0167150 A1 | 6/2013 | Meketa | |
| 2014/0279862 A1* | 9/2014 | Dietz | H04L 41/0806 |
| | | | 707/609 |
| 2015/0006730 A1* | 1/2015 | Helfman | G06F 9/5072 |
| | | | 709/226 |
| 2015/0120962 A1 | 4/2015 | Cai et al. | |

OTHER PUBLICATIONS

Pfaff et al, Extending Networking in the Virtualization Layer, 8th ACM Workshop on Hot Topics in Networks, Oct. 2009, accessible from the Internet at <http://www.icsi.berkeley.edu/pubs/networking/extendingnetworking09.pdf><http://citeseerx.ist.psu.edu/viewdoc/summary?doi=10.1.1.185.212> as of Aug. 7, 2014, 6 pages.

Wailly, A et al, "Towards Multi-Layer Autonomic Isolation of Cloud Computing and Networking Resources", Network and Information Systems Security, 2011 Conference, accessible from the Internet at <http://www.zurich.ibm.com/~cca/asG2011/submissions/wailly.pdf><http://ieeexplore.ieee.org/xpl/login.jsp?tp=&arnumber=5931358&url=http%3A%2F%2Fieeexplore.ieee.org%2Fxpls%2Fabs_all.jsp%3Farnumber%3D5931358> as of Aug. 7, 2014, 9 pages.

Hong Cai, "A Transparent Approach of Enabling SaaS Multi-tenancy in the Cloud", 2010 fith World Congress, Jul. 2010, accessible from the Internet at <http://ieeexplore.ieee.org/xpl/login.jsp?tp=&arnumber=5575773&url=http%3A%2F%2Fieeexplore.ieee.org%2Fxpls%2Fabs_all.jsp%3Farnumber%3D5575773> as of Aug. 7, 2014, 8 pages.

Non-final Office Action, dated Oct. 31, 2016, U.S. Appl. No. 14/510,887, filed Oct. 9, 2014, In re Cai, 24 pages.

Non-final Office Action, dated Feb. 14, 2017, U.S. Appl. No. 14/510,887, filed Oct. 9, 2014, In re Cai, 13 pages.

"List of IBM Patents or Patent Applications Treated as Related", dated May 6, 2017, 2 pages.

\* cited by examiner

SHARING A JAVA VIRTUAL MACHINE

BACKGROUND

1. Technical Field

The invention relates to virtualization technology. More particularly, the invention relates to a method and system for sharing a JAVA virtual machine (JVM).

2. Description of the Related Art

Multi-tenant JAVA virtual machine (JVM) (JAVA is a registered trademark of Oracle America, Inc.) technology allows multiple tenant programs to run in a shared JAVA virtual machine. This technology will play an important role in high-density deployment within a cloud environment.

However, current multi-tenant JAVA virtual machines can not realize network isolation among multiple tenants. If a tenant is not configured correctly, network resources (such as ports) will have conflicts. In addition, since network isolation is not realized, the ability to control network resource over the tenants is very limited. For example, without isolation, it is hard to configure different firewall strategies for different tenants.

SUMMARY

Therefore, there is a need for a method and system for sharing a JAVA virtual machine, which can realize network isolation among multiple tenants sharing a JAVA virtual machine.

One or more embodiments of the invention provide a method for sharing a JAVA virtual machine having multiple tenants. The method comprises allocating an IP address to each of the multiple tenants, respectively. The method comprises creating a separate virtual network interface for each of the multiple tenants and configuring the allocated IP address, respectively, wherein, for each of the multiple tenants, its network operation is performed via the virtual network interface created for that tenant.

According to an embodiment of the invention, if an IP address of a tenant is bound to IPADDR_ANY, the method further comprise binding localhost of that tenant to another port which is different from a localhost port shared by all tenants and establishing a mapping between the another port and the localhost port shared by all tenants.

One or more embodiments of the invention also provide a system for sharing a JAVA virtual machine having multiple tenants. The system comprises an allocating unit configured to allocate an IP address to each of the multiple tenants, respectively. The system comprises a creating unit configured to create a separate virtual network interface for each of the multiple tenants and configure the allocated IP address, respectively, wherein, for each of the multiple tenants, its network operation is performed via the virtual network interface created for that tenant.

According to an embodiment of the invention, if an IP address of a tenant is bound to IPADDR_ANY, the system further comprises a binding unit configured to bind the localhost of that tenant to another port that is different from a localhost port shared by all tenants and an establishing unit configured to establish a mapping between the another port and the localhost port shared by all tenants.

With the method and system of the illustrative embodiments, network isolation among multiple tenants sharing a JAVA virtual machine can be realized.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for purposes of explanation, one or more embodiments will be described in more detail with reference to the accompanying drawings, in which one or more embodiments of the present invention have been illustrated. It will be apparent, however, to one skilled in the art that the present invention can be implemented in various manners, and thus should not be construed to be limited to the embodiments disclosed herein.

Figure 1:
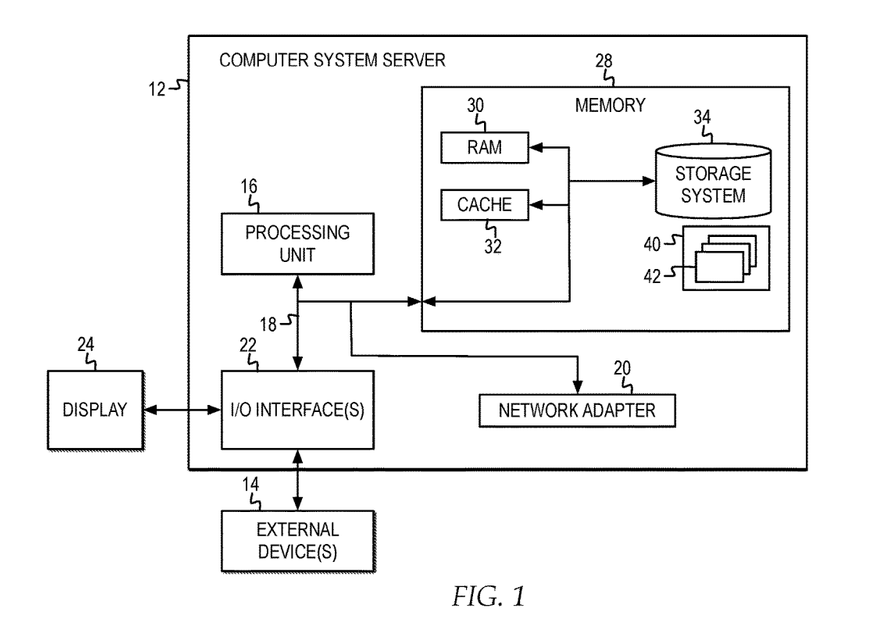
FIG. 1 shows one example of a block diagram of a computer system or server system in which one embodiment of the invention may be implemented.

Referring now to FIG. 1, in which a block diagram of a computer system/server 12, which is applicable to implement one or more embodiments of the present invention, is shown. Computer system/server 12 is only illustrative and is not intended to suggest any limitation as to the scope of use or functionality of the one or more embodiments described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. For example, such architectures may include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set of at least one of program modules 42, may be stored in memory 28, by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments of the invention as described herein.

Computer system/server 12 may also communicate with one or more external devices 14 including, but not limited to, a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. In addition, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples of other hardware and/or software components may include, but are not limited to, microcode, device drivers, redundant processing units, external disk drive arrays, RAID systems, tape drives, and data archival storage systems.

In addition to conventional computer system/server 12 shown in FIG. 1, one or more mobile electric devices may also be included for achieving one or more embodiments of the invention, including, but not limited to, mobile telephone, PDA, tablet computer and others. Typically, a mobile electric device has one or more input devices, including, but not limited to, a touch input device, such as, touch screen, touch panel, and others.

With respect to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2A:
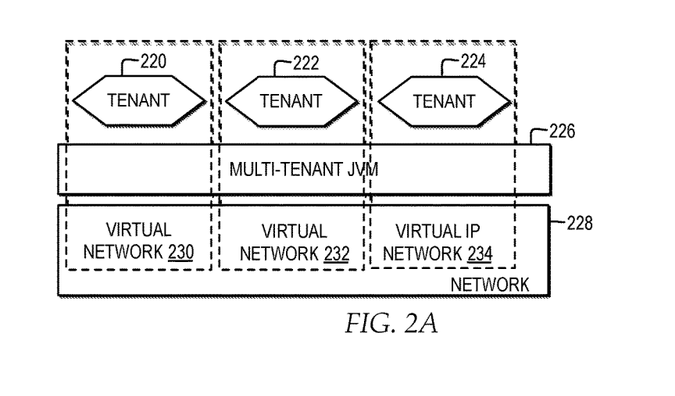
FIGS. 2A-2B show one example of a block diagram of a shared, multi-tenant JVM and a flowchart illustrating a method for sharing a JAVA virtual machine according to an embodiment of the invention.
Figure 2B:
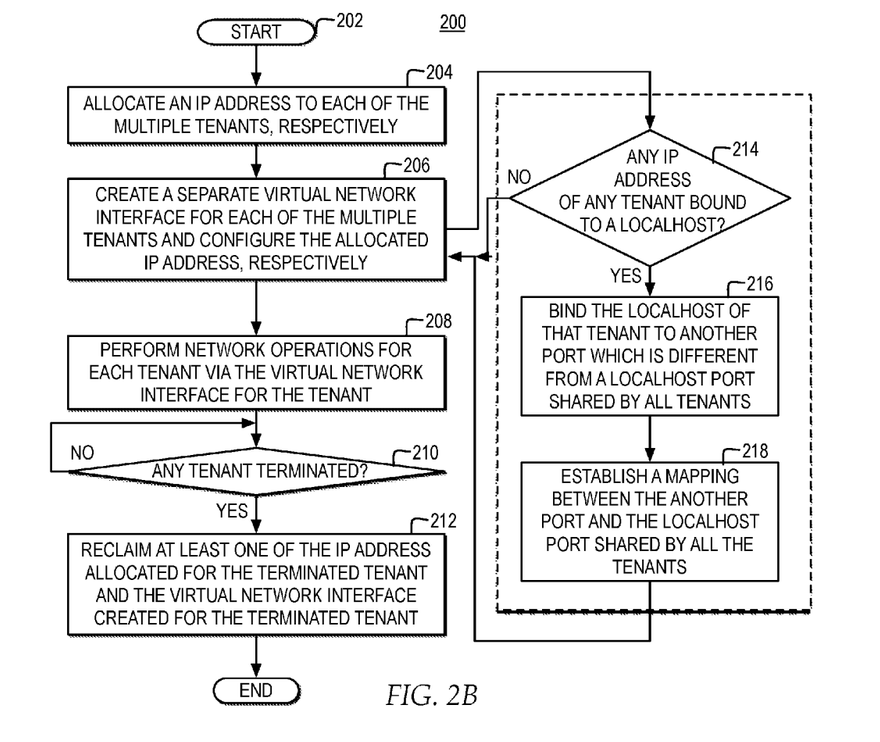

FIGS. 2A-2B illustrate one example of a flowchart of a method 200 for sharing a JAVA virtual machine (JVM) according to an embodiment of the invention is shown. In the method illustrated in FIG. 2, the JVM is a multi-tenant JVM 226 that has multiple tenants 220, 222, and 224, operating on a network 228. In one example, method 200 starts at block 202. Next, method 200 proceeds to block 204. Block 204 illustrates allocating an IP address to each of the multiple tenants, respectively. For example, an IP address may be allocated to each of tenant 220, tenant 222, and tenant 224. According to an embodiment of the invention, DHCP protocol may be utilized to allocate an IP address to each of the tenants, and the IP address of each tenant may be different from each other. In addition, any other possible approaches in the art may also be utilized to allocate an IP address to each of the multiple tenants.

Next, method 200 proceeds to a block 206. Block 206 illustrates creating a separate virtual network interface for each of the multiple tenants and configuring the separate virtual network interface with the allocated IP address, respectively. For example, at block 206, a separate virtual network interface 230 may be created for tenant 220 and configured to the IP address allocated to tenant 220, a separate virtual network interface 232 may be created for tenant 222 and configured to the IP address allocated to tenant 222, and a separate virtual network 234 may be created for tenant 224 and configured to the IP address allocated to tenant 224. Next, block 208 illustrates, for each of the multiple tenants, performing each tenant's network operation via the virtual network interface created for that tenant.

According to an embodiment of the invention, multi-tenant JVM 226 may include a virtualization technology application program interface (API) for creating a separate virtual network interface for each of the multiple tenants on demand and configuring the separate virtual network interface with the allocated IP address for each respective tenant. An example of the virtualization technology application program interface may be libvirt. In one example, a libvirt layer may reside atop a linux host layer, which resides atop a node layer. Libvirt is an API that can create tools to manage guest OSs, which provides a VM monitoring program unknown by the native JVM API, to securely manage guest OSs running on a host. XML codes for configuring a virtual network by utilizing libvirt are given below. The codes below may be embodied as JAVA native invocation (JNI) as a tenant aware class library for supporting network isolation of tenants. By embodying the code as JNI, multi-tenant JVM 226 can utilize the JNI to create a virtual network interface for a tenant, on demand.

For network configuration:

```
<network>
    <name>Example Network</name>
    <bridge name="virbr100" />
    <forward mode="route" />
    <ip address="10.10.120.1" netmask="255.255.255.0" />
</network>
```

For creating a virtual IP network:

```
virNetworkPtr network;
network=virNetworkCreateXML(conn, xml)
```

For destroying a virtual IP network:
int virNetworkDestroy(virNetworkPtr network)

One of ordinary skill in the art will appreciate that the example codes given above are merely illustrative. Similarly, the example of libvirt as an API given above is also for illustration, and the one or more embodiments of the invention are not limited to libvirt. Those skilled in the art may utilize other suitable API in the art, such as Microsoft® Windows® Hyper-v, to create a virtual network interface with the allocated IP address for each of the multiple tenants, respectively; the description given above should not be used to limit protection scope of claims. In addition, libvert may support virtualization to create a virtual network interface with the allocated IP address for each of the multiple tenants through a bridged mode, such as a shared physical device, where internally, the option to run in a routing mode or a bridged mode may be chosen at runtime, depending on the customer network environment.

According to an embodiment of the invention, next, block 208 illustrates performing each tenant's network operation via the virtual network interface created for that tenant. After an IP address is allocated and a separate virtual network interface is created for a tenant and the allocated IP address is configured, all network operations of the tenant will be intercepted and redirected transparently to the virtual network interface created for that tenant. Multi-tenant JVM 226 may identify a tenant via tenant context information. The tenant context information refers to, for a certain network operation request, identification describing a particular tenant related to that request. The tenant context describes to which tenant a network operation request belongs. The tenant context may be represented by a unique tenant identifier. With tenant context information, multi-tenant JVM 226 identifies a particular tenant related to a certain network operation request, and in turn redirects that network operation request to a virtual network interface created for that particular tenant, such that network operation of the tenant is performed via the virtual network interface created for that particular tenant.

According to an embodiment of the invention, next, block 210 illustrates a determination whether any tenant is terminated. At block 210, if a tenant is terminated, then the process passes to block 212. Block 212 illustrates reclaiming network resources allocated to a tenant, including, but not limited to, reclaiming the IP address allocated to that tenant and reclaiming the virtual network interface created for that tenant, and the process ends.

According to an embodiment of the invention, returning to block 206, method 200 may include a process included in block 206, and starting at block 214. Block 214 illustrates a determination whether any IP address of any tenant is bound to a local host. At block 214, if any IP address of any tenant is bound to a local host, method 200 further comprises the steps at block 216 of binding the localhost of that tenant to another port that is different from a localhost port shared by all tenants. Next, block 218 illustrates establishing a mapping between the another port and the localhost port shared by all tenants. Binding to IPADDR_ANY means binding a tenant to both the IP address allocated for a tenant and the localhost of a tenant itself. Since the localhost is shared by all tenants in a JVM, isolation among multiple tenants may be realized by binding the localhost of that tenant to another port which is different from a localhost port shared by all tenants, and establishing a mapping between the another port and the localhost port shared by all tenants. For example, if the IP address of a tenant is bound to IPADDR_ANY, it means that the tenant has bound its network operation to both of the allocated IP address and its localhost. In one example, in a JVM, the localhost port shared by all tenants is 8080. In order to realize isolation among multiple tenants, the localhost of each tenant may be bound to another port which is different from localhost port 8080 shared by all tenants, for example, the localhost of a tenant may be bound to port 9000 and a mapping between port 8080 and port 9000 established at the tenant. In performing network operations, data sent onto the localhost of that tenant (i.e. data sent via localhost port 8080) is actually sent onto localhost port 9000. In addition, when receiving data from local host port 8080, the tenant receives data from local host port 9000, with multi-tenant JVM 226 assisting with an update of a source address once data is received. Similarly, if the IP address of another tenant is also bound to IPADDR_ANY, it means that the IP address of that tenant is also bound to its localhost. In order to realize isolation between the tenant mentioned above and the another tenant, the localhost of the another tenant may be bound to another port which is different from localhost port 8080 shared by all tenants and port 9000 bound to localhost of the tenant mentioned above. For example, the localhost of the tenant is bound to port 12000, and a mapping between port 8080 and port 12000 is established at the another tenant. In performing network operations, data sent to the localhost of the another tenant (i.e. data sent via localhost port 8080) is actually sent via localhost port 12000. Isolation among multiple tenants is realized by multi-tenant JVM 226 by ensuring that the localhost of each of the multiple tenants bound to IPADDR_ANY has a different port range from each other. The mapping port is not visible to external parties.

Figure 4:
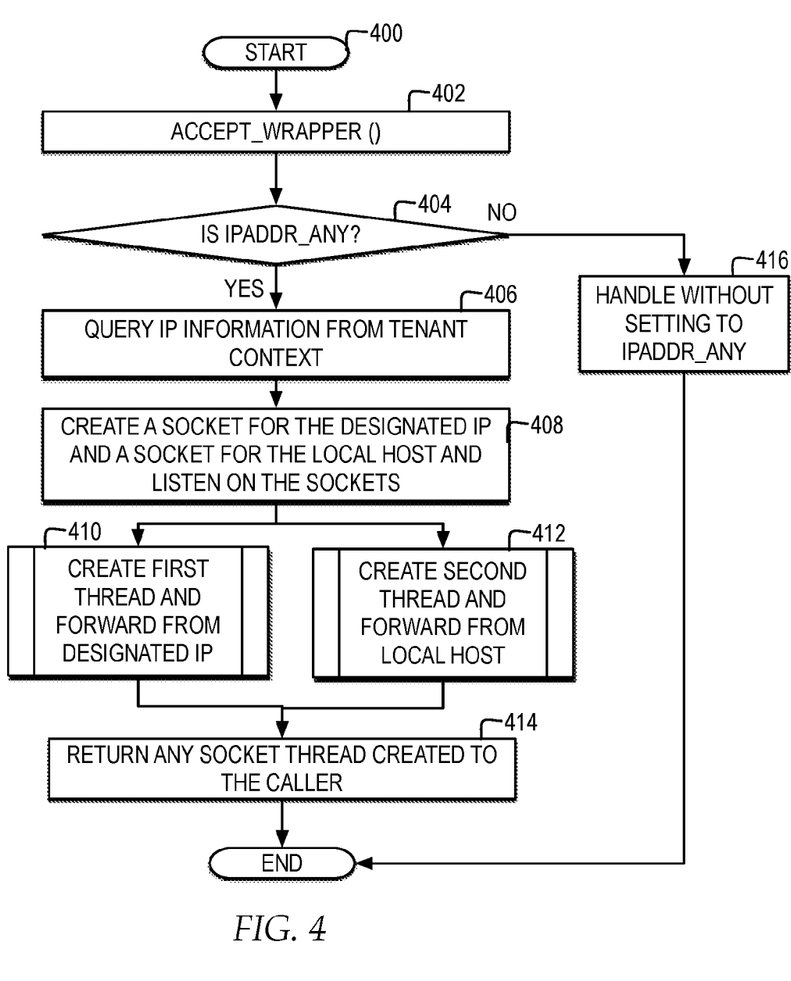
FIG. 4 illustrates one example of a high level logic flowchart of a process and program for handling an accept transmission.

In one example, in a class library of a JVM wrappers are included for bind, accept, receive and send. In one embodiment, the JVM wrappers of multi-tenant JVM 226 are updated to support network isolation for each tenant. In one implementation of a Bind method at the JAVA underlying layer, unlike conventional JDK, the Bind method of one embodiment of the invention, in response to the operation relates to an address of IPADDR_ANY, does nothing until real network transmission (such as Accept) occurs. In one example, FIG. 4 illustrates a high-level logic flowchart of a process and program for handling an accept transmission. In one example, the process starts at block 400 and proceeds to block 402. At block 402, when real network transmission (such as Accept) occurs, an accept wrapper is triggered. Next, at block 404, if it is determined that the operation does not relate to an address of IPADDR_ANY, the process passes to block 416. Block 416 illustrates handling the accept wrapper without a setting to IPADDR_ANY, and the process ends. Otherwise, at block 404, if it is determined that the operation relates to an address of IPADDR_ANY, then the process passes to block 406. Block 406 illustrates querying the IP allocation information from the tenant context. Next block 408 illustrates creating two sockets, with one socket used to listen to IP address allocated for tenant and the other socket used to listen to localhost. At block 410, if the connection occurs on the first socket, a first thread is created and forwarded to the accept wrapper from the designated IP address and at block 412, if the connection occurs on the second socket, a second thread is created and forwarded to the accept wrapper from the local host. Block 414 illustrates returning any socket thread created, to the caller. For example, assuming that a tenant performs an Accept operation through Bind IPADDR_ANY, if a remote connection occurs on an IP address allocated to that tenant, then a socket matching with that IP address is returned, and no special processing will be performed for any subsequent network operations occurring on that socket. Otherwise, if the connection occurs on the localhost, a socket matching with the localhost of that tenant is returned, wherein, the port in the socket matching with the localhost is the aforementioned another port which is different from the localhost port shared by all tenants, and the another port may be determined via the mapping as mentioned above.

Figure 3:
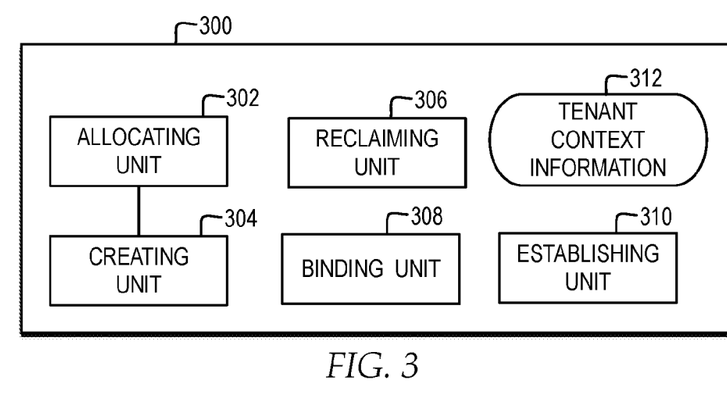
FIG. 3 shows one example of a block diagram of a system for sharing a JAVA virtual machine according to an embodiment of the invention.

FIG. 3 illustrates one example of a block diagram of a system 300 for sharing a JAVA virtual machine according to an embodiment of the invention, wherein the JAVA virtual machine has multiple tenants. As shown, system 300 for sharing a JAVA virtual machine comprises an allocating unit 302 configured to allocate an IP address to each of multiple tenants, respectively. In addition, system 300 comprises a creating unit 304 configured to create a separate virtual network interface for each of the multiple tenants and configure the allocated IP address, respectively, wherein, for each of the multiple tenants, its network operation is performed via the virtual network interface created for that tenant.

According to an embodiment of the invention, creating unit 304 utilizes a virtualization technology application program interface to create a separate virtual network interface for each of the multiple tenants and configure the allocated IP address, respectively. An example of a virtualization technology application program interface includes but not limited to libvirt.

According to an embodiment of the invention, system 300 further comprises a reclaiming unit 306 configured to reclaim network resources allocated to a tenant in response to the tenant being terminated, including, but not limited to, reclaiming the IP address allocated for that tenant and reclaiming the virtual network interface created for that tenant.

According to an embodiment of the invention, the multiple tenants are each identified via tenant context information 312.

According to an embodiment of the invention, if an IP address of a tenant is bound to IPADDR_ANY, system 300 further comprises a binding unit 308 configured to bind the localhost of that tenant to another port that is different from a localhost port shared by all tenants and an establishing unit 310 configured to establish a mapping between the another port and the localhost port shared by all tenants.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for sharing a JAVA virtual machine comprising a plurality of tenants, the method comprising:
   allocating, by a computer system, a separate IP address, from among a plurality of IP addresses, to each tenant of the plurality of tenants of a multi-tenant java virtual machine;
   creating, by the computer system, each separate virtual network interface, from among a plurality of separate virtual network interfaces on demand, for each tenant of the plurality of tenants through a virtualization technology application program interface on top of an operating system hosting the multi-tenant java virtual machine which resides on top of a node layer;
   configuring, by the computer system, each separate virtual network interface with the respective separate IP address allocated for each tenant, wherein one or more network operations for each tenant are performed via each separate virtual network interface created for each tenant; and
   performing, by the computer system, for each tenant of the plurality of tenants, the one or more network operations for each tenant via the separate virtual network interface configured for each tenant by intercepting the one or more network operations of each tenant and redirecting the one or more network operations transparently to the separate virtual network interface configured for each tenant.

2. The method according to claim 1, further comprising:
   in response to a termination of a particular tenant from among the plurality of tenants, reclaiming, by the computer system, a particular IP address allocated to the particular tenant from among the plurality of IP addresses and reclaiming a particular virtual network interface allocated to the particular tenant from among the plurality of virtual network interfaces.

3. The method according to claim 1, further comprising:
   identifying, by the multi-tenant java virtual machine, each tenant of the plurality of tenants via separate tenant context information for redirecting the one or more network operations transparently to the separate virtual network interface configured for each tenant; and
   binding each tenant to both a local host shared between the plurality of tenants sharing the multi-tenant java virtual machine and to a separate port mapped to the respective separate IP address allocated for each tenant.

4. The method according to claim 1, wherein creating, by the computer system, each separate virtual network interface, from among a plurality of separate virtual network interfaces on demand, for each tenant of the plurality of tenants through a virtualization technology application program interface on top of an operating system hosting the multi-tenant java virtual machine which resides on top of a node layer further comprises:
   creating each separate virtual network interface of the plurality of separate virtual network interfaces through the virtualization technology application program interface for creating a virtual machine monitoring program not available to a native application programming interface of the multi-tenant java virtual machine to securely manage one or more guest operating systems comprising the operating system.

5. A system for sharing a JAVA virtual machine comprising a plurality of tenants, the system comprising:
   at least one processor coupled to a memory and operative to allocate a separate IP address, from among a plurality of IP addresses, to each tenant of the plurality of tenants of a multi-tenant java virtual machine;
   the at least one processor operative to create each separate virtual network interface, from among a plurality of separate virtual network interfaces on demand, for each tenant of the plurality of tenants through a virtualization technology application program interface on top of an operating system hosting the multi-tenant java virtual machine which resides on top of a node layer;

the at least one processor operative to configure each separate virtual network interface with the respective separate IP address allocated for each tenant, wherein one or more network operations for each tenant are performed via each separate virtual network interface created for each tenant; and the at least one processor operative to perform, for each tenant of the plurality of tenants, the one or more network operations for each tenant via the separate virtual network interface configured for each tenant by intercepting the one or more network operations of each tenant and redirecting the one or more network operations transparently to the separate virtual network interface configured for each tenant.

6. The system according to claim 5, further comprising:

the at least one processor operative to, in response to a termination of a particular tenant from among the plurality of tenants, reclaim a particular IP address allocated to the particular tenant from among the plurality of IP addresses and reclaim a particular virtual network interface allocated to the particular tenant from among the plurality of virtual network interfaces.

7. The system according to claim 5, wherein each tenant of the plurality of tenants is identified by the multi-tenant java virtual machine via separate tenant context information for redirecting the one or more network operations transparently to the separate virtual network interface configured for each tenant and each tenant is bound to both a local host shared between the plurality of tenants sharing the multi-tenant java virtual machine and to a separate port mapped to the respective separate IP address allocated for each tenant.

8. A computer program product for sharing a JAVA virtual machine comprising a plurality of tenants, the computer program product comprising a non-transitory computer readable storage medium having program instructions embodied therewith, the program instructions executable by a computer to cause the computer to:

allocate, by the computer, a separate IP address, from among a plurality of IP addresses, to each tenant of the plurality of tenants of a multi-tenant java virtual machine;

create, by the computer, each separate virtual network interface, from among a plurality of separate virtual network interfaces on demand, for each tenant of the plurality of tenants through a virtualization technology application program interface on top of an operating system hosting the multi-tenant java virtual machine which resides on top of a node layer;

configure, by the computer, each separate virtual network interface with the respective separate IP address allocated for each tenant, wherein one or more network operations for each tenant are performed via each separate virtual network interface created for each tenant; and perform, by the computer, for each tenant of the plurality of tenants, the one or more network operations for each tenant via the separate virtual network interface configured for each tenant by intercepting the one or more network operations of each tenant and redirecting the one or more network operations transparently to the separate virtual network interface configured for each tenant.

9. The computer program product according to claim 8, further comprising program instructions executable by the computer to cause the computer to:

in response to a termination of a particular tenant from among the plurality of tenants, reclaim, by the computer, a particular IP address allocated to the particular tenant from among the plurality of IP addresses and a particular virtual network interface allocated to the particular tenant from among the plurality of virtual network interfaces.

10. The computer program product according to claim 8, further comprising program instructions executable by the computer to cause the computer to:

identify, by the multi-tenant java virtual machine, each tenant of the plurality of tenants via separate tenant context information for redirecting the one or more network operations transparently to the separate virtual network interface configured for each tenant; and bind each tenant to both a local host shared between the plurality of tenants sharing the multi-tenant java virtual machine and to a separate port mapped to the respective separate IP address allocated for each tenant.

\* \* \* \* \*